(No Model.) 6 Sheets—Sheet 1.

H. A. J. RIECKERT.
STRAW TWISTING MACHINE.

No. 425,187. Patented Apr. 8, 1890.

(No Model.) 6 Sheets—Sheet 2.

H. A. J. RIECKERT.
STRAW TWISTING MACHINE.

No. 425,187. Patented Apr. 8, 1890.

Witnesses
W. R. Davis.
C. Sedgwick

Inventor
H. A. J. Rieckert
Munn & Co
Atty's.

(No Model.) 6 Sheets—Sheet 3.
H. A. J. RIECKERT.
STRAW TWISTING MACHINE.
No. 425,187. Patented Apr. 8, 1890.
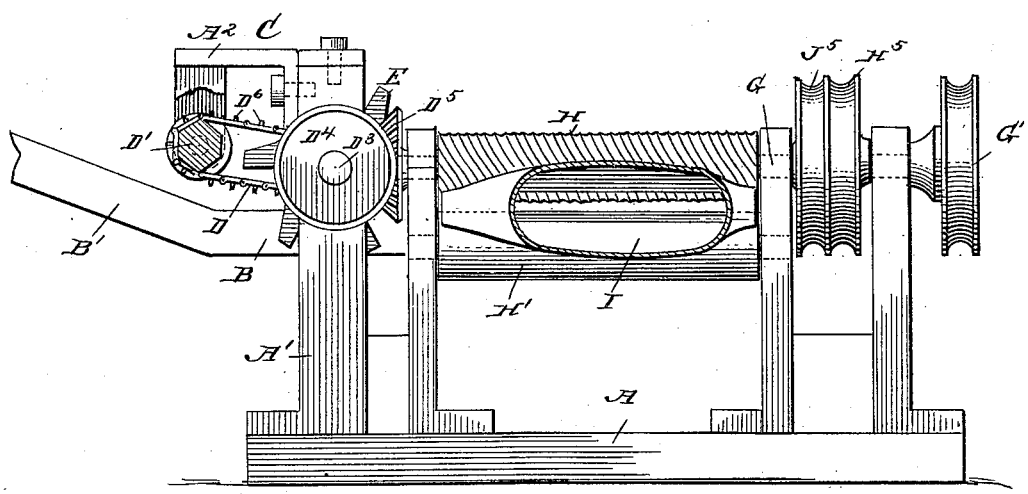
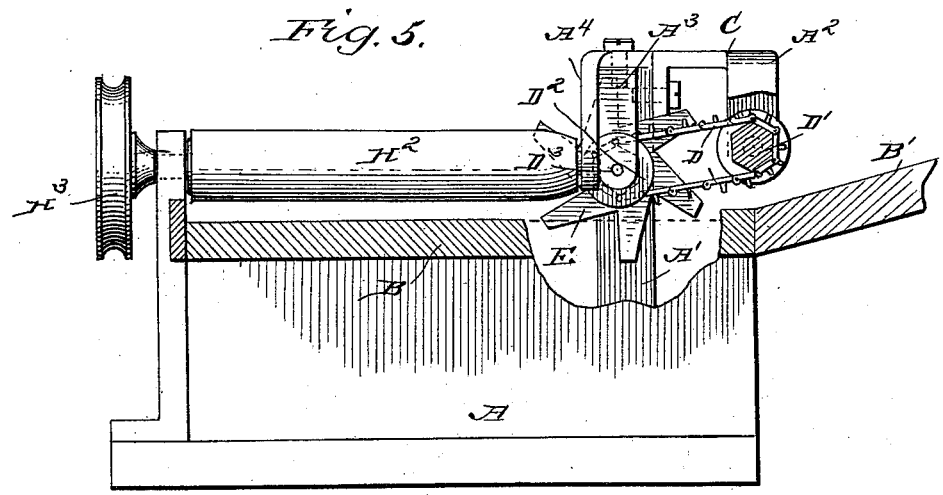
Witnesses
W. R. Davis
C. Sedgwick
Inventor
H. A. J. Rieckert
Munn & Co.
Att'ys (No Model.) 6 Sheets—Sheet 4.
H. A. J. RIECKERT.
STRAW TWISTING MACHINE.
No. 425,187. Patented Apr. 8, 1890.
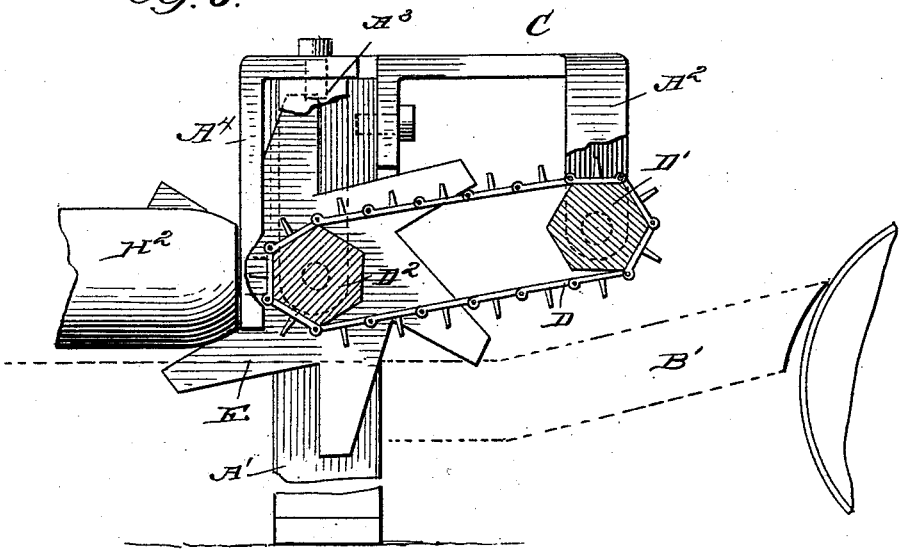
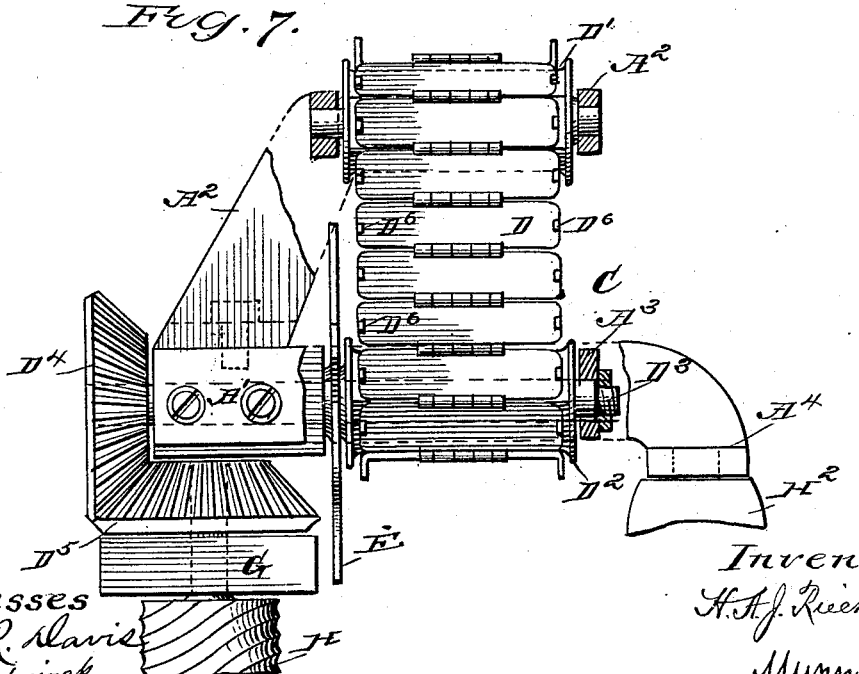

(No Model.) 6 Sheets—Sheet 5.
H. A. J. RIECKERT.
STRAW TWISTING MACHINE.
No. 425,187. Patented Apr. 8, 1890.
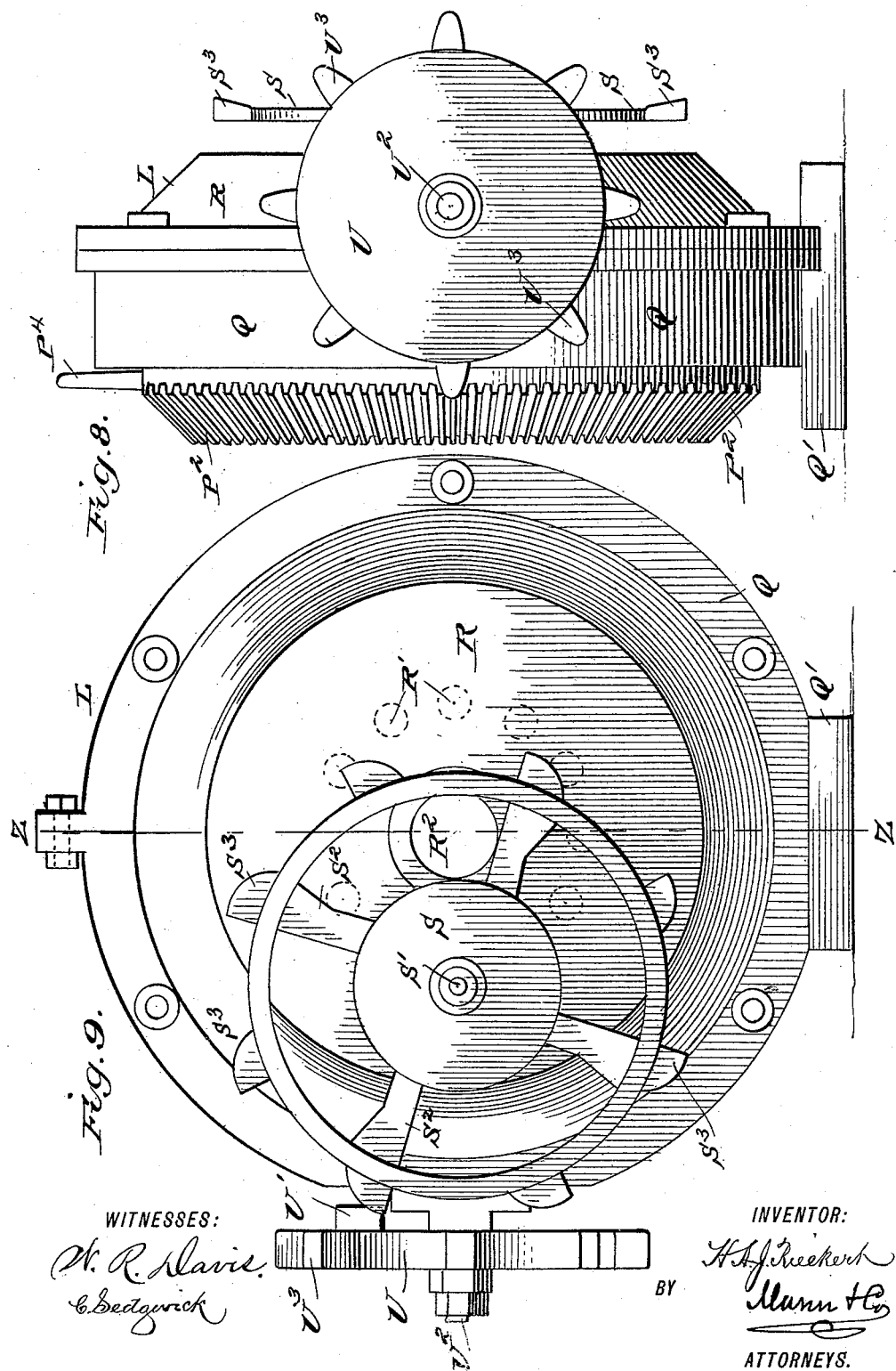
WITNESSES:
INVENTOR:

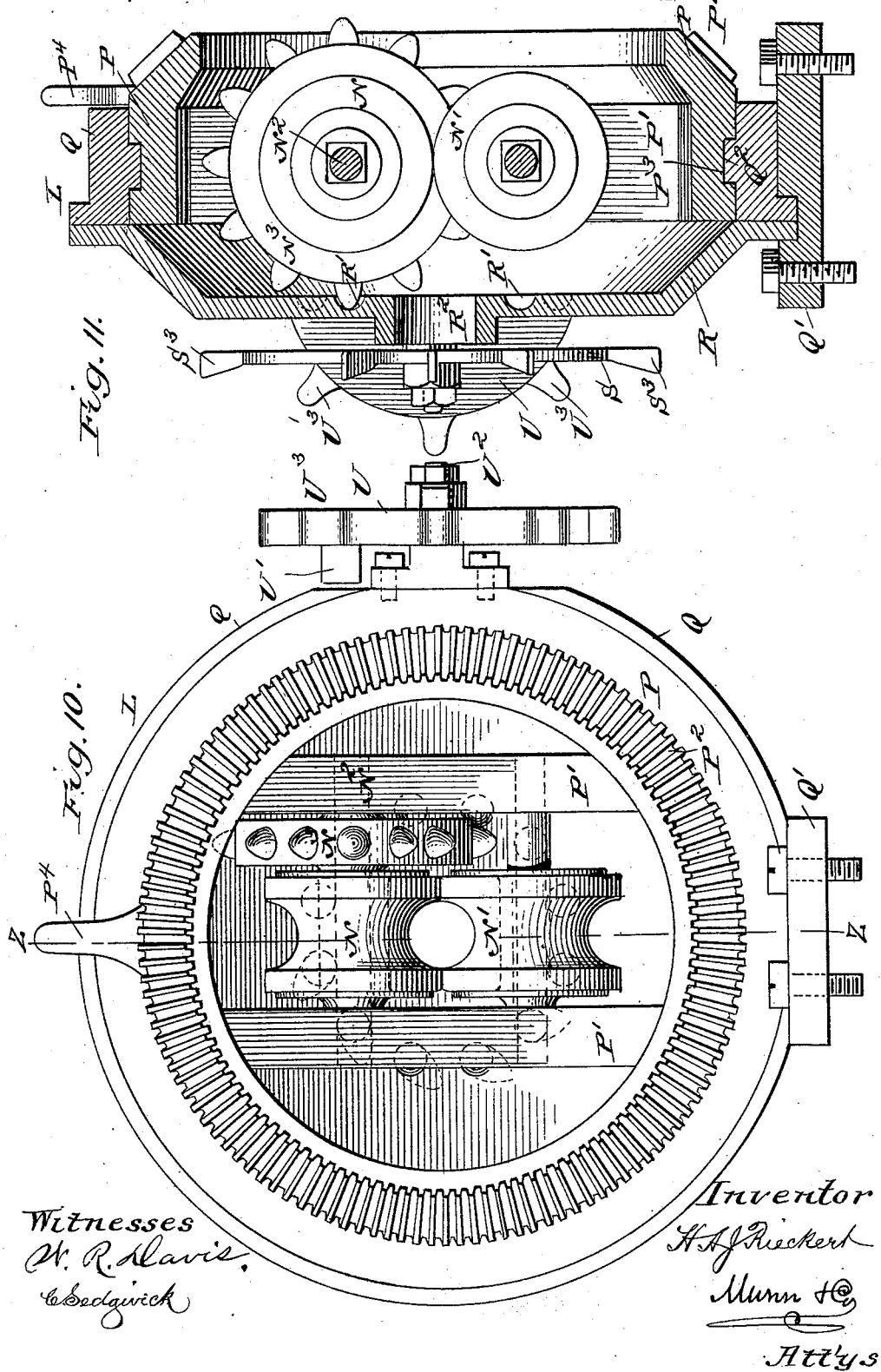

UNITED STATES PATENT OFFICE.

HERMAN A. J. RIECKERT, OF NEW YORK, N. Y.

STRAW-TWISTING MACHINE.

SPECIFICATION forming part of Letters Patent No. 425,187, dated April 8, 1890.

Application filed July 10, 1889. Serial No. 317,082. (No model.)

*To all whom it may concern:*

Be it known that I, HERMAN A. J. RIECKERT, of the city, county, and State of New York, have invented a new and Improved Straw-Twisting Machine, of which the following is a full, clear, and exact description.

The object of the invention is to provide a new and improved machine for twisting straw to form a band or bands for binding sheaves of grain.

The invention consists of a straw-breaker forming the feed for a twisting mechanism.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
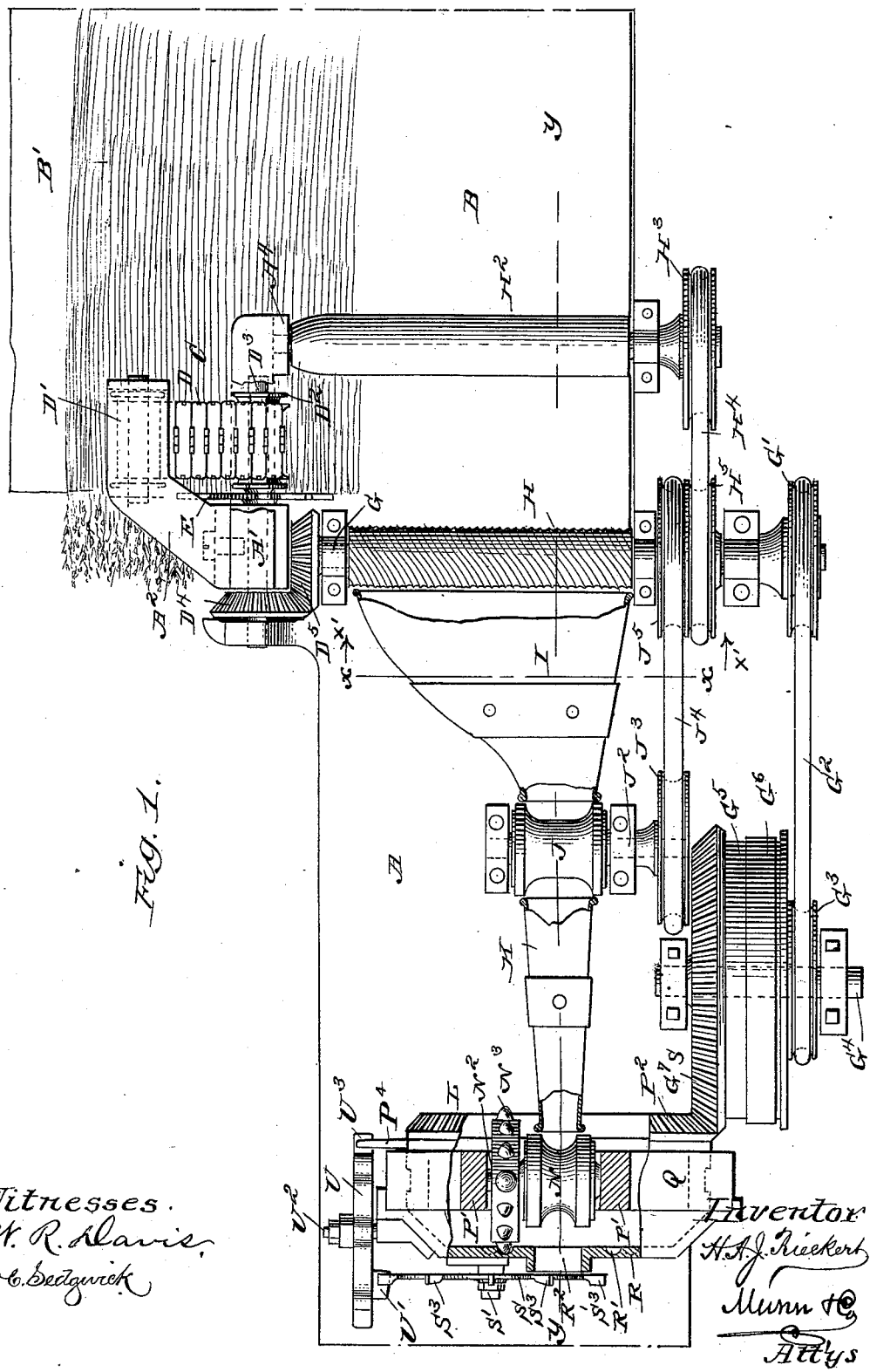
Figure 2:
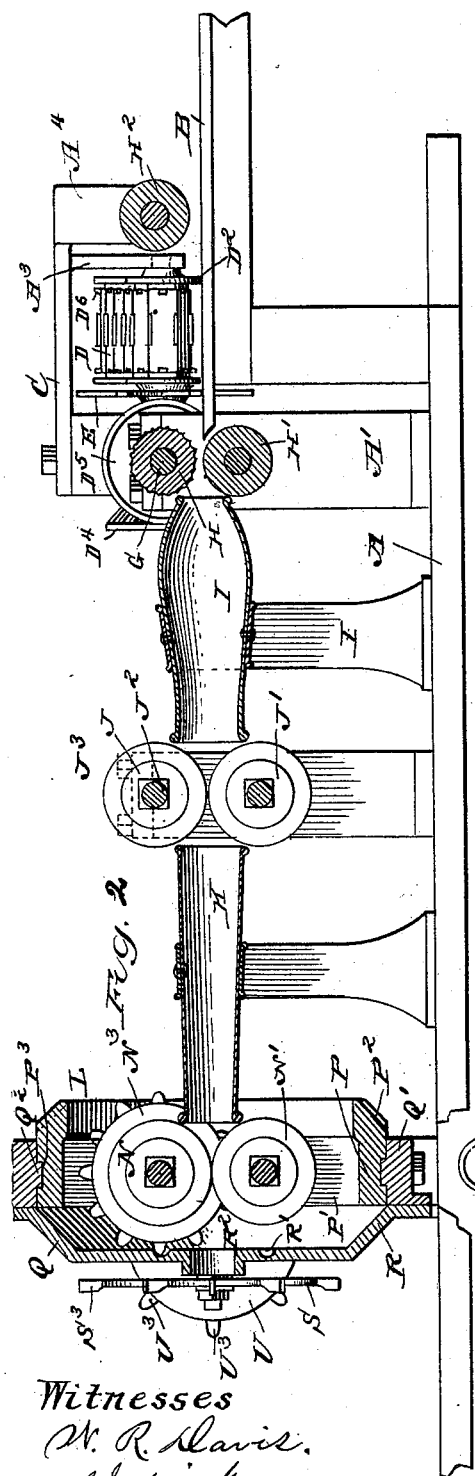
Figure 3:
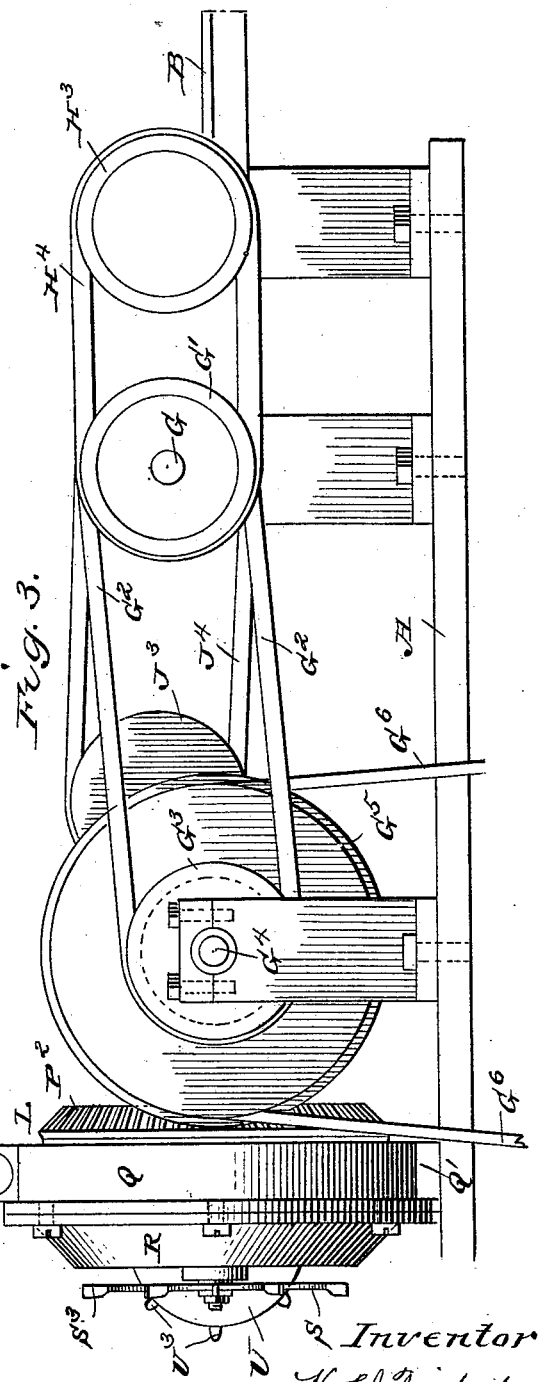

Figure 1 is a plan view of the improvement with parts broken out. Fig. 2 is a sectional side elevation of the same on the line $y\ y$ of Fig. 1. Fig. 3 is a side elevation of the driving mechanism. Fig. 4 is a transverse section of the breaker on the line $x\ x$ of Fig. 1, looking in the direction of the arrow $x'$. Fig. 5 is an end view of the ear cutting and feeding mechanism with parts in section. Fig. 6 is an enlarged end view of the same with parts in section and parts broken out. Fig. 7 is an enlarged plan view of the same. Fig. 8 is an enlarged rear side elevation of the twisting and cutting mechanism. Fig. 9 is an outer end elevation of the same. Fig. 10 is an inner end elevation of the same, and Fig. 11 is a sectional side elevation of the same on the lines $z\ z$ of Figs. 9 and 10.

The improved straw-twisting machine, presently to be described in detail, is specially intended as an attachment for a reaper, part of the grain cut by the latter being used by the twisting-machine to form bands for tying the sheaves of grain cut and gathered by the reaper. The twisting-machine may be used separately, forming a machine independent of the reaper.

The improved straw-twisting machine is provided with a base A, which supports a table B, extending horizontally and provided at either edge with an inclined part B', onto which the grain to be used for making bands is placed either by hand or by the reaper, according to whether the machine is used as an attachment to a reaper or as an independent machine. The grain placed on the inclined part B' of the table B passes first to a feeding and ear-cutting mechanism C, provided with an endless chain D and a knife-wheel E, fitting against one edge of the table B and serving to cut the ears or heads from the straw. The ears or heads fall into a separate receptacle, while the straw is used in the machine for forming bands. The endless chain D passes over the pulleys D' and D², mounted to turn in suitable bearings formed in the brackets A² and A³, projecting from a post A', erected on the base A. The pulley D' is placed somewhat higher than the pulley D², so that the chain D is slightly inclined, as is plainly shown in Figs. 5 and 6. The shaft D³ of the pulley D² carries the knife-wheel E, previously mentioned, and is also provided with the bevel gear-wheel D⁴, meshing into a bevel gear-wheel D⁵, secured on a shaft G, mounted to turn in suitable bearings formed in standards erected on the base A.

On the outer end of the shaft G is secured a pulley G', over which passes a belt G², also passing over a pulley G³, secured on a shaft G⁴, mounted to turn in suitable bearings on the base A and provided with a pulley G⁵, connected by a belt G⁶ with machinery for driving the straw-twisting machine. Said machinery may be an independent machine or mechanism connected with the reaper.

On the outer ends of the chain D are secured projecting pins D⁶, adapted to engage the grain to move the same to the knives of the knife-wheel E, so that the latter will cut off the heads or ears while the straw passes forward onto the table B.

The shaft G carries a roller H, provided with spiral corrugations and located above a plain roller H', which forms, with the said roller H, the straw-breaking mechanism and also the feed for the twister proper. A roller H² is placed parallel with the rollers H and H' and over the table B, so that the straw pushed forward on the table by the endless chain D passes under the said roller H², so that the latter feeds the straw forward between the breaking-rollers H and H'. The roller H² is mounted to turn at one end in a suitable bearing formed in a bracket A⁴, supported from the post A′, while the other end is mounted in a post erected on the base A. On the shaft of the roller H² is secured a pulley H³, over which passes a belt H⁴, also passing over a pulley H⁵, secured on the shaft G, previously mentioned. The rollers H, H′, and H² thus rotate together when the shaft G is rotated. The breaking-rollers H and H′ discharge into a casing I, having one end as wide as the rollers H are long, and then narrowing down at its other end to form a cylinder, which end discharges between the two grooved rollers J and J′, mounted to turn in suitable bearings in standards erected on the base A. The rollers J and J′ are very narrow, so as to form a flat band of the straw passing through the casing I and between the said rollers. The shaft J² of the upper roller J is provided with a pulley J³, over which passes a belt J⁴, also passing over a pulley J⁵, secured on the shaft G. The rollers J and J′ are thus rotated from the shaft G, which turns the breaking-rollers H H′ and the feed-rollers H². The rollers J and J′ discharge into the large end of a conical tube K, leading to the twisting mechanism L, provided with two grooved rollers N and N′, located one above the other, and between which the small end of said conical tube K opens. The rollers N and N′ are mounted to turn in suitable bearings formed in posts P′, secured in a wheel P, mounted to turn in a circular casing Q, provided with a base Q′, secured on the base A. The rollers N and N′ thus turn and at the same time move with the wheel P, rotated by means of the bevel gear-wheel P², secured on the inner face of said wheel P and meshing into the bevel gear-wheel G⁷, secured on a shaft G⁴ alongside the pulley G⁵ and rotating with the same. The axes of the rollers N and N′ stand at right angles to the axis of the wheel P, so that the straw in passing from the tube K between the said rollers N and N′ is moved forward, and at the same time twisted into a band.

In order to conveniently hold the wheel P in the casing Q, I provide the rim of the wheel P with an annular groove P³, into which fits a corresponding annular offset Q², formed on the inside of the circular casing Q.

On the shaft N² of the roller N is secured a gear-wheel N³, the teeth of which mesh into recesses R′, arranged in a circle in a cover R, secured to the casing Q. Thus when the wheel P turns in the casing Q the gear-wheel N³ rolls off in the recesses R′, and consequently turns the roller N, which by being in frictional contact by means of its flanges with the roller N′ also turns the latter.

The cover R is provided with a circular hub R² in line with the tube K, so that the band, after being twisted by its rollers N and N′, passes through the said hub R² and is wound upon a suitable drum, in case the band is to be left continuous, or the said band is cut off at the outer edge of the said hub R² by knives S² of a knife-wheel S, turning on a stud S′, secured on the outer face of the cover R. The knives S² are preferably V-shaped, as is plainly shown in Fig. 9, and are located such distances apart that the wheel S in rotating cuts off a band of straw of a certain length.

On the knife-wheel S are arranged a number of lugs S³, placed equal distances apart and adapted to be operated on one at a time by a lug U′, secured on the inner face of a wheel U, mounted to turn on a stud U², secured on the periphery of the casing Q. The wheel U is provided on its periphery with lugs U³, placed equal distances apart and adapted to be engaged one at a time by a tooth or pin P⁴, projecting from the periphery of the wheel P. As the latter makes one revolution it turns the wheel U a distance equal to the space between two lugs U³ on the wheel U, and when the latter makes one complete revolution it moves the knife-wheel S a distance equal to the space between two lugs S³, of which there is double the number of the knives S², and consequently at every second revolution of the wheel U one of the knives S² is moved past the outer edge of the hub R² to cut the bands.

The operation is as follows: As the grain is laid on the table its ears or heads project beyond the edge of the said table, as is plainly shown in Fig. 1, and when the machine is set in motion by turning the pulley G⁵ the chain D feeds the grain toward the knife E, and the latter cuts off the heads or ears, while the straw passes under the roller H² and is fed forward by the rotary motion of the latter between the breaking-rollers H and H′, in which the straw is broken diagonally and fed into the wide opening of the casing I. One of the rollers H or H′ is made smooth and the other is provided with spiral corrugations, so that the straw in passing through the rollers is broken only on one side by the action of the spiral corrugations, in consequence of which the straw bends at the same time the straw is twisted, as the breaks or indentations extend diagonally across the straw. In passing through the casing I the straw moves together in a bunch and finally passes through the narrow mouth of the said casing between the rollers J and J′, in which the straw is formed into a narrow band, which passes from the said rollers into the conical tube K, which still reduces the size of the band by gathering the several straws closer together. When the band passes through the narrow mouth of the tube K, it is taken hold of by the rollers N and N′, which by their rotary motions feed the band forward, at the same time holding it long enough in place to twist it as the said rollers turn with the revolving wheel P. The twisted band, after leaving the rollers N and N′, passes through the hollow hub R² and is cut off at regular intervals into suitable lengths by the knives S² of the knife-wheel or rotary knife S, rotated in the manner previously described.

It is understood that when the machine is used directly on the reaper only a small portion of the grain is passed onto the table B', the rest of the grain passing in the usual manner to the binder to be bound by the bands formed by the twisting-machine and cut off in suitable lengths for sheaves of regular size.

As previously mentioned, the knife S and the mechanism connected with it may be dispensed with, and the twisted band, after leaving the hub $R^2$, may be wound upon a roller to be used on the binding mechanism on the reaper, instead of using short bands of a certain length for the sheaves.

Having thus described my invention, what I claim as new, and desire to secure by Letters Patent, is—

1. In a straw-twisting machine, the combination, with a twisting mechanism, of a straw-breaker forming the feed for the said twisting mechanism, substantially as shown and described.

2. In a straw-twisting machine, the combination, with a revolving knife, of an endless feed-chain for delivering the grain to the said knife to sever the straw from the heads or ears, substantially as shown and described.

3. In a straw-twisting machine, the combination, with breaking-rollers, of twisting-rollers mounted to turn and turning in a revolving wheel, substantially as shown and described.

4. In a straw-twisting machine, the combination, with breaking-rollers, of twisting-rollers mounted to turn and turning in a revolving wheel and a conical tube held between the said breaking-rollers and the said twisting-rollers, substantially as shown and described.

5. In a straw-twisting machine, the combination, with breaking-rollers, of twisting-rollers mounted to turn and turning in a revolving wheel, a conical tube held between the said breaking-rollers and the twisting-rollers, and a rotary knife for cutting the twisted band after it leaves the said twisting-rollers, substantially as shown and described.

6. In a straw-twisting machine, the combination, with an endless chain and a rotary knife for cutting off the heads of the grain, of a roller located in the rear of the said endless chain, held in line with the travel of the said endless chain, and breaking-rollers mounted to turn and placed parallel with the said first-named roller, substantially as shown and described.

7. In a straw-twisting machine, a breaking mechanism comprising a roller provided with spiral corrugations and a plain roller, both turning together, substantially as shown and described.

8. In a straw-twisting machine, the combination, with a casing provided with a cover having recesses arranged in a circle and equal distances apart, of twisting-rollers mounted to turn in the said wheel and in frictional contact with each other and a gear-wheel held on one of the said twisting-rollers and adapted to engage by means of its teeth the said recesses in the cover, substantially as shown and described.

9. In a straw-twisting machine, the combination, with a casing provided with a cover having recesses arranged in a circle and equal distances apart, of twisting-rollers mounted to turn in the said wheel and in frictional contact with each other, a gear-wheel held on one of the said twisting-rollers and adapted to engage by means of its teeth the said recesses in the cover, and a rotary knife operating over the discharge-hub of the said cover and actuated from the said revolving wheel, substantially as shown and described.

10. In a straw-twisting machine, the combination, with a casing provided with a cover having recesses arranged in a circle and equal distances apart, of twisting-rollers mounted to turn in the said wheel and in frictional contact with each other, a gear-wheel held on one of the said twisting-rollers and adapted to engage by means of its teeth the said recesses in the cover, a rotary knife operating over the discharge-hub of the said cover and actuated from the said revolving wheel, and intermediate mechanism for turning the said rotary knife from the said rotating wheel, substantially as shown and described.

HERMAN A. J. RIECKERT.

Witnesses:
   THEO. G. HOSTER,
   C. SEDGWICK.